United States Patent
Schmidt et al.

(10) Patent No.: US 12,055,728 B2
(45) Date of Patent: Aug. 6, 2024

(54) METHOD AND LIGHT MICROSCOPE FOR A HIGH-RESOLUTION EXAMINATION OF A SAMPLE

(71) Applicant: ABBERIOR INSTRUMENTS GMBH, Goettingen (DE)

(72) Inventors: Roman Schmidt, Goettingen (DE); Benjamin Harke, Goettingen (DE); Matthias Reuss, Goettingen (DE); Lars Kastrup, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 0 days.

(21) Appl. No.: 18/283,349

(22) PCT Filed: Mar. 25, 2022

(86) PCT No.: PCT/EP2022/057879
§ 371 (c)(1),
(2) Date: Sep. 21, 2023

(87) PCT Pub. No.: WO2022/200549
PCT Pub. Date: Sep. 29, 2022

(65) Prior Publication Data
US 2024/0085680 A1   Mar. 14, 2024

(30) Foreign Application Priority Data
Mar. 26, 2021  (DE) .............. 10 2021 107 704.4

(51) Int. Cl.
*G02B 27/58* (2006.01)
*G02B 21/00* (2006.01)

(52) U.S. Cl.
CPC ......... *G02B 27/58* (2013.01); *G02B 21/0072* (2013.01); *G02B 21/0076* (2013.01); *G02B 21/008* (2013.01)

(58) Field of Classification Search
CPC ............ G02B 21/0072; G02B 21/0076; G02B 21/008; G02B 27/58
See application file for complete search history.

(56) References Cited

U.S. PATENT DOCUMENTS

| 2005/0141081 A1 | 6/2005 | Olschewski |
| 2013/0128025 A1 | 5/2013 | Dyba et al. |

(Continued)

FOREIGN PATENT DOCUMENTS

| DE | 199 59 228 A1 | 6/2001 |
| DE | 10 2010 036 709 A1 | 2/2012 |

(Continued)

OTHER PUBLICATIONS

Schmidt, R., Weihs, T., Wurm, C.A. et al. MINFLUX nanometer-scale 3D imaging and microsecond-range tracking on a common fluorescence microscope. Nature Communications 12, Article No. 1478 (2021). https://doi.org/10.1038/s41467-021-21652-z (Year: 2021).*

(Continued)

*Primary Examiner* — Stephone B Allen
*Assistant Examiner* — Tamara Y. Washington
(74) *Attorney, Agent, or Firm* — MOSER TABOADA

(57) ABSTRACT

The present specification relates to a method for light microscopic examination of a sample (6), in particular by means of laser scanning or MINFLUX microscopy, in which a drift of the sample (6) or of an object in a sample (6) with respect to the light microscope (26) is detected and, if necessary, corrected. In particular, the present specification relates to a corresponding method for examining the sample (6) using laser scanning or MINFLUX microscopy. For this purpose, reference markers (8, 13) are located in the sample, the position of which is repeatedly determined according to the MINFLUX principle in order to determine the drift.

33 Claims, 8 Drawing Sheets

(56) References Cited

U.S. PATENT DOCUMENTS

| | | |
|---|---|---|
| 2016/0305884 A1 | 10/2016 | Hell |
| 2018/0259458 A1 | 9/2018 | Hell et al. |
| 2020/0011559 A1 | 1/2020 | Wan et al. |
| 2020/0393378 A1 | 12/2020 | Hell et al. |
| 2022/0011559 A1 | 1/2022 | Schmidt et al. |
| 2022/0114738 A1 | 4/2022 | Schmidt |

FOREIGN PATENT DOCUMENTS

| | | |
|---|---|---|
| DE | 10 2017 104 736 B3 | 8/2018 |
| DE | 10 2019 108 696 B3 | 8/2020 |
| DE | 10 2020 127 071 B3 | 6/2021 |
| EP | 1 548 485 A1 | 6/2005 |
| WO | WO 2015/097000 A1 | 7/2015 |
| WO | WO 2020/201430 A1 | 10/2020 |

OTHER PUBLICATIONS

International Search Report for PCT/EP2022/057879 dated Jul. 28, 2022.

R. McGorty et al., Active microscope stabilization in three dimensions using image correlation, Optical Nanoscopy , Dec. 28, 2013, 13 pages, 2 (1), 3 doi: 10.1186/2192-2853-2-3.

F. Balzarotti et al., Nanometer resolution imaging and tracking of fluorescent molecules with minimal photon fluxes, Science 355 (6325), Feb. 10, 2017, 80 pages, http://science.sciencemag.org/.

J. Prescher, Assembly and optimization of a super-resolution STORM microscope for nanoscopic imaging of biological structures,2016, 166 pages Dissertation, Munich.

C. Geisler et al., Drift estimation for single marker switching based imaging schemes, Optics Express, Mar. 26, 2012, 16 pages, vol. 20, No. 7.

K.C. Gwosch et al., MINFLUX Nanoscopy Delivers Multicolor Nanometer 3D-Resolution in (Living) Cells, bioRxiv, 2019, 37 pages, doi: 10.1101/734251.

K.C. Gwosch et al., MINFLUX Nanoscopy Delivers Multicolor Nanometer 3D-Resolution in (Living) Cells Nature Methods, 2023, 33 p. 17 (2), 217, www.nature.com/naturemethods, https://doi.org/10.1038/s41592-019-0688-0.

L.A. Masullo et al., =Pulsed Interleaved MINFLUX, Nano Letters, 2020, 50 pgs, 21 (1), 840, www.nature.com/naturephotonics, https://dx.doi.org/10.1021/acs.nanolett.0c04600.

M. Weber et al., MINSTED fluorescence localization and nanoscopy, bioRxiv, nature photonics, May 2021, 24 pp. 24, vol. 15, www.nature.com/naturephotonics, https://doi.org/10.1038/s41566-021-00774-2.

* cited by examiner

METHOD AND LIGHT MICROSCOPE FOR A HIGH-RESOLUTION EXAMINATION OF A SAMPLE

TECHNICAL FIELD

The present specification relates to a method for examining a sample by light microscopy, in which a drift of the sample or of an object in a sample with respect to a measuring arrangement is detected and, if necessary, corrected. In particular, the present specification relates to a corresponding method for examining the sample by means of laser scanning or MINFLUX microscopy and to a light microscope carrying out this method.

In MINFLUX microscopy, the positions of individual particles, usually single molecules of a fluorescent dye, are determined by scanning the particles at multiple positions with a light distribution of an excitation light that comprises a local intensity minimum. From the positions of the individual particles, high-resolution images of the sample or trajectories of the particles can be obtained. Since MINFLUX microscopy can achieve spatial resolutions down to the single-digit nanometer range, MINFLUX microscopy is particularly dependent on the stability of the sample or the objects examined in the sample relative to the measuring means of the microscope. Even the smallest displacements lead to inaccuracies in localization and motion blur in the images created from the positions of the particles.

Slow drifts of the sample relative to the microscope due to thermal expansion can be reduced on the instrument side with suitable mechanical designs and by selecting materials with small coefficients of thermal expansion. However, these measures involve considerable technical effort and cannot completely prevent the drift of a sample, especially over longer measurement times. In particular, the aforementioned design measures are not sufficient to meet stability requirements in the range of a few nanometers, which are required when using high-resolution microscopy techniques. Therefore, there is a special interest in precisely detecting occurring drifts in order to be able to correct them, in particular by compensation or data correction. At the same time, the detection of the drift should interfere as little as possible with the actual examination of the sample.

PRIOR ART

The publication WO 2015/097000 A1 and the publication "Balzarotti F, Eilers Y, Gwosch K C, Gynna A H, Westphal V, Stefani F D, Elf J, Hell S W. Nanometer resolution imaging and tracking of fluorescent molecules with minimal photon fluxes. Science. 2017 Feb. 10; 355(6325):606-612. doi: 10.1126/science.aak9913. Epub 2016 Dec. 22. PMID: 28008086." describe a method, now known by the acronym MINFLUX, for localizing spatially isolated fluorescent molecules by illuminating each of the individual molecules with an intensity distribution of excitation light that exhibits an intensity minimum at different scanning positions. For each of the illumination positions, the fluorescence emission excited by the excitation light is registered, and the position of the respective molecule is inferred from the course of the intensity of the fluorescence light along the positions of the intensity minimum. By its nature, this position determination is subject to error; however, the error of the position determination can be reduced by applying the method iteratively. For this purpose, the illumination positions are adjusted before each iteration step, i.e., arranged closer around the respective assumed position of the molecule. At the same time, the Zo strength of the excitation light is increased so that the intensity gradient increases near the intensity minimum. Alternatively, the measurement time can be increased, which corresponds to an increase in the strength of the excitation light with respect to the amount of effective light. With the parameters adjusted, the molecule is successively illuminated at each of the adjusted illumination positions and the intensity of the fluorescence emission is recorded. From the dependence of the fluorescence signal on the scanning positions of the intensity minimum, the position of the molecule can now be determined with less error than before. These method steps can be repeated until convergence of the position determination or until another termination criterion is reached, for example a predetermined maximum acceptable error. With an achievable localization accuracy of about 1 nm, the MINFLUX method represents the most precise commercially available localization method for fluorescent molecules according to the current prior art.

WO 2015/097000 A1 further discloses that a (high-resolution) image of the distribution of the molecules in the sample can be obtained from the position data of the individual molecules ("MINFLUX imaging"). This method corresponds to the procedure known from STORM and PALM microscopy for generating high-resolution images from a large number of position determinations of individual fluorescent molecules, but in the case of MINFLUX microscopy results in a further increased spatial resolution of the images of 5 nm.

DE 10 2017 104 736 B3 describes a variant of the MINFLUX method in which the scanning of the isolated fluorescent dye molecules is not performed by illuminating them with an intensity distribution of excitation light having a local intensity minimum, but with two essentially complementary intensity distributions of an excitation light and a fluorescence prevention light. In this case, the intensity distribution of the excitation light comprises a local intensity maximum, while the intensity distribution of the fluorescence prevention light comprises a local intensity minimum at the same location. Specifically, the fluorescence prevention light may be STED light, which prevents excited fluorescent dye molecules from emitting fluorescence photons in the edge regions of the intensity distribution of the excitation light by triggering stimulated emission. Thus, in this embodiment of the method, the excitation light and the fluorescence prevention light are superimposed with such intensity distributions as is done in RESOLFT and STED microscopy. This variant of the MINFLUX method takes advantage of the fact that the intensity of the fluorescence light registered for the respective fluorescent dye molecule depends on its distance from the local intensity minimum of the fluorescence prevention light, and that its position can be determined with high accuracy from the intensities of the fluorescence light registered for several positions of the intensity minimum of the fluorescence prevention light. Also in this variant of the MINFLUX method, the local intensity minimum can be positioned at a few positions in the sample and the evaluation of the intensities of the registered fluorescent light can be performed according to the same principles as in MINFLUX microscopy. However, as a difference remains that in MINFLUX microscopy the intensity of the fluorescent light from the fluorescent marker increases with increasing distance of its position to the position of the local intensity minimum, while in the embodiment of the method in which the further light is fluorescence prevention light, it decreases with increasing distance.

A known problem from STORM and PALM microscopy is that the sample to be imaged moves relative to the microscope system during data acquisition, compromising localization accuracy. During image reconstruction, this results in motion blur and washed-out images. In keeping with the high localization accuracy, this problem applies to a greater extent when localizing molecules using the MINFLUX method. Acceptable relative movements between the sample and the microscope system here are in the range of 1 nm or less.

Various approaches to sample stabilization are known from the prior art, especially for STORM and PALM microscopy, proposing either readjustment of the sample position during the time of data acquisition or subsequent correction of the image data.

A laser scanning microscope with a temperature sensor is known from DE 199 59 228 A1, in which the focus position is tracked by a correction value determined from a calibration curve for the respective current temperature. However, this method is limited to the correction of thermal drifts in the axial direction, i.e., the focusing.

In EP 1 548 485 A1 a method and a microscope executing this method are proposed, in which images of a preferably immobile object are taken at different times, wherein a motion estimator is used to calculate the drift between the image captures, in which the drift detection is performed by comparing corresponding blocks (and possibly sub-blocks) of the images. The drifts determined for the blocks individually can then be computed into an overall drift. The actual correction can be done either by subsequent processing of the image data or by tracking the beam or sample position during image acquisition.

R. McGorty, D. Kamiyama, B. Huang, "Active microscope stabilization in three dimensions using image correlation," Optical Nanoscopy 2 (1), 3 (2013) discloses a method in which sample drift is compensated for by tracking a piezo-driven sample stage to within 10 nm in the x and y directions and 20 nm in the z direction. The sample drift is determined by cross-correlating transmitted light images of the sample with a reference transmitted light image, wherein the drift in the x- and y-directions is determined from the position of the maximum of the cross-correlation and the drift in the z-direction is determined from its amplitude. To acquire the transmitted light images, the sample is transilluminated with infrared light, which does not affect the fluorescence imaging.

From J. Prescher, "Assembly and optimization of a super-resolution STORM microscope for nanoscopic imaging of biological structures", PhD thesis, Munich (2016) a method for lateral drift correction in PALM/STORM microscopy is known, for which fluorescent nanoparticles are introduced into the sample as reference objects. To determine the drift of the sample in the x and y directions, epifluorescence images of these nanoparticles are repeatedly acquired during STORM data acquisition and correlated with a reference epifluorescence image acquired initially. From the location of the maximum of the cross-correlation, the drift in the x- and y-directions is determined for the respective time point and used for position correction in the localization of the fluorescent single molecules.

From C. Geisler et al, "Drift estimation for single marker switching based imaging schemes," Optics Express 20, 7274 (2012), a method for drift correction in STORM/PALM microscopy is known that is also based on correlation of multiple camera (raw) images, but in which sample drift is determined as a function of time by pairwise correlation of all camera (raw) images, not just by correlation with a single reference image. Without having to make any other assumptions about the cause or nature of the drift, or modifying the data acquisition, accuracy in single-molecule localization can be greatly improved.

OBJECTIVE

The present specification is based on the objective of specifying a method and a light microscope for examining a sample, in which a drift of the sample or of an object in a sample with respect to a measuring arrangement is detected and, if necessary, corrected during the examination of the sample. In this context, the detection and correction must also meet the accuracy requirements of MINFLUX microscopy and should interfere with the examination of the sample as little as possible.

SOLUTION

The objective is attained by a method according to independent claim 1, and by a light microscope according to independent claim 32. Dependent claims 2 to 30 relate to embodiments of the method, dependent claim 31 to the use of a sample carrier in a method according to the present specification, and dependent claim 33 to an embodiment of the light microscope.

DESCRIPTION

The present specification relates to a method for light microscopic examination of a sample, in which the sample is illuminated with focused laser light at a plurality of illumination positions and an optical signal is detected from the sample. The examination of the sample with the focused laser light may be performed according to a wide range of imaging modalities, for example, confocal laser scanning microscopy, STED microscopy, or by localizing individual particles in the sample using a MINFLUX method. Characteristically, the illumination of the sample with the focused laser light and the detection of the optical signal occurs in a location-based manner and, if applicable, with high spatial resolution, and is therefore susceptible to falsification due to drift of the sample.

According to the present specification, a drift of the sample is therefore detected by a repeated determination of the position of at least one reference marker according to the MINFLUX principle, wherein the determination of the position of the reference markers is integrated into the measuring sequence of the examination of the sample and is carried out repeatedly between the illumination of the sample at successive illumination positions. In particular, the method allows the drift of the sample to be tracked and compensated for over long periods of time, i.e., over hours or days. In principle, the method (unlike some alternative methods) is not limited to drift detection in two dimensions, but can be applied optionally in one, two or three spatial directions.

The MINFLUX method for determining the position of the at least one reference marker is characterized in that the reference marker is illuminated with an intensity distribution of a scanning light comprising a local minimum at several scanning positions around its (presumed) position, wherein the scanning light induces or modulates a light emission of the reference marker. The scanning positions are arranged in a close range—typically within an Airy disk—around the position of the reference marker, which is at least approximately known (for example from a previous measurement). From the light emissions registered at the different scanning positions, the position of the reference marker can be determined with improved accuracy, for example by forming a weighted vector sum. The scanning positions may be illuminated stepwise by the scanning light, or the scanning positions may lie on a curve or define sections along which the sample is illuminated by continuous displacement of the excitation light beam relative to the sample. In the second case, time intervals (dwell times) can be defined during the continuous displacement of the excitation light beam, by means of which the photons detected by the detector are assigned to specific scanning positions, similar to what is known, for example, from continuous line scanning in confocal laser microscopy. The scanning positions are arranged around a presumed position of the reference marker—this means that the scanning positions are within a circle or a sphere (e.g., the aforementioned close range) around the presumed position. Of course, this also includes only two scanning positions that are e.g., on opposite sides on a line intersecting the presumed position.

The specific design of the MINFLUX method can be varied in many aspects; reference is also made to the prior art in MINFLUX microscopy, for which only exemplary reference is made here to the publications by K. C. Gwosch et al. (2019), "MINFLUX Nanoscopy Delivers Multicolor Nanometer 3D-Resolution in (Living) Cells," bioRxiv doi: 10.1101/734251 and M. Weber et al. (2020), "MINSTED fluorescence localization and nanoscopy," bioRxiv doi: 10.1101/2020.10.31.363424. Thus, for the purposes of the present specification and the claims, the term MINFLUX methods is to be interpreted broadly to include all embodiments having at least the aforementioned (and optionally other) features.

The type of light emission for the localization of the reference markers may be very different, in particular it may be a fluorescence or phosphorescence, a Rayleigh or Raman scattered light, a CARS scattered light (Coherent Anti Stokes Raman Scattering) or a light emission generated by frequency multiplication (frequency doubling, frequency tripling etc.) of or by frequency mixing with the scanning light. According to the present specification, the scanning light is suitable to excite or induce the respective type of light emission of the reference markers or to modulate it in its intensity, wherein the modulation may have an amplifying or weakening effect on the intensity of the light emission. If the scanning light has a modulating effect and does not itself excite or induce light emission from the reference marker, it is necessary to additionally illuminate the reference markers with an excitation light. For example, fluorescent reference markers can be scanned with a scanning light that excites the fluorescence. However, it is equally possible that the scanning light induces stimulated emission and thus suppresses the spontaneous (fluorescence) emission of the reference markers; in this case, the reference markers must be stimulated with an additional excitation light to emit the light emission.

In particular, the reference markers are photostable. This means that the light emission of the reference markers remains largely unchanged over a desired time period of a light microscopy experiment. In particular, therefore, the reference markers do not bleach during the desired time period and no dark states of the reference markers occur during the desired time period. The appropriate time period may vary depending on the requirements of the experiment. For long-term measurements, for example, periods of hours to days may be desirable. However, for certain experiments, a period of less than a second, a millisecond, or even a microsecond may be sufficient.

In an embodiment of the method according to the present specification, the examination of the sample is performed by capturing images of the sample with a laser scanning method, for example by means of confocal or STED microscopy. In these cases, the images are typically acquired by scanning the sample line by line with focused excitation light and, in the case of STED microscopy, additionally with an intensity distribution of the STED light that is superimposed on the focused excitation light and comprises a local minimum. The scanning may be interrupted regularly—for example after scanning a predefined number of scan lines—or at fixed time intervals in order to determine the position of a reference marker according to the MINFLUX method and to determine a drift. The scanning of the sample may then be continued with a corrected control of the scanning, taking into account the determined drift. In order to completely eliminate the influence of the drift on the image of the sample, the accuracy of the drift correction must be below the spatial resolution capability of the laser scanning method, ideally by a factor 2. Since MINFLUX methods inherently achieve significantly higher resolution than laser scanning methods, this requirement is regularly met.

In a further embodiment of the method according to the present specification, not only is the position of the reference markers determined, but the sample is also examined using a MINFLUX method. For this purpose, the sample contains, in addition to the reference markers, further particles which can be localized with a MINFLUX method and which also have fluorescent or light-scattering properties but can be distinguished from the reference markers. In many applications, these particles are single molecules of a fluorescent dye used to label a structure of interest in the sample. Fluorescent dyes that have both a fluorescent and a non-fluorescent state and for which the ratio of dye molecules in the fluorescent state to dye molecules in the nonfluorescent state can be adjusted so that only a single dye molecule is present in the fluorescent state at any time per diffraction-limited volume, allowing independent localization of individual molecules, are suitable for labeling. The adjustment of the ratio between fluorescent and non-fluorescent dye molecules can be done by adjusting the chemical composition of the medium or also light-induced; the skilled person may refer to the state of the art for PALM/STORM and MINFLUX microscopy.

In this embodiment, coordinates of the localized particles are first collected during the examination of the sample, from which high-resolution images of the sample and/or trajectories of individual particles can subsequently be determined. Therein, on the one hand, a drift correction can be performed by tracking the sample by the respective amount of drift determined from the position determination of the reference markers. However, it is also possible to correct the coordinates of the particles by the amount of drift purely by calculation, so that tracking of the sample does not have to be performed. In this case, for example, a drift-corrected image can already be displayed as a live image on a display unit during the measurement.

If the sample is examined using a MINFLUX method, the precision of the drift correction must be higher than that of the localization of individual particles for examination of the sample. To completely eliminate the influence of drift on the localizations, a precision higher by a factor 2 should be aimed for. Since both the examination of the sample and the drift determination of the sample are performed using MINFLUX methods, the spatial resolving power due to the method is the same for both. However, the respective localization accuracy in MINFLUX depends on several acquisition parameters, in particular the number of localization iterations, the respective arrangement of scanning positions, and the intensity of the scanning light. Since the reference markers have a much higher photostability than single dye molecules, the localization of the reference markers may be performed with a higher resolution.

When examining the sample using a MINFLUX method, the measurement need not, of course, be interrupted between illuminating the sample with the scanning light at the illumination positions to localize a fluorophore (i.e., during a MINFLUX localization sequence), but an entire localization of a fluorophore, for example, or even localizations of several different fluorophores may be performed in succession before the measurement is interrupted and a position determination of the reference markers is performed.

A particularly advantageous embodiment of the method according to the present specification results when the laser light for examining the sample is used simultaneously (i.e., within the same measurement) as scanning light for determining the positions of the reference markers. Such a double use of the laser light is particularly suitable if, for the purpose of examining the sample by means of MINFLUX or STED microscopy, an intensity distribution of an excitation or STED light is generated anyway, which comprises a local intensity minimum. In these cases, the same beam deflection means provided for the examination of the sample by means of MINFLUX or STED microscopy can also be used, by suitable control, to direct the laser light to reference markers in the sample, to determine their position according to the MINFLUX principle, and to detect a drift by repeated such position determinations. This implementation of drift detection (and, if applicable, drift correction) can be integrated into the sample analysis process with little effort and requires no additional optical or mechanical components. It is therefore constructively simpler and economically advantageous over alternative solutions that require additional beam paths, light sources, and/or detection devices. However, an even more important, since fundamental, advantage is that the method detects the drift of the reference markers relative to the very optical imaging system used to examine the sample. In this respect, drift detection differs from alternative methods of drift detection, which usually require additional light sources, optical elements, separate beam paths and detectors or other sensors, and in which drift is detected between the sample, a sample carrier or a component of the microscope on the one hand, and the additional elements for drift detection on the other hand. A possible drift between these additional elements for drift detection and the optical imaging system for examining the sample cannot be detected in this way.

In particular, in the dual use of the scanning light described above, the scanning light comprises the same light distribution (e.g., a donut-shaped or bottle-beam-shaped light distribution) at the focus as the laser light for examining the sample. In the variant of the MINFLUX method in which the sample is illuminated with a superposition between a Gaussian-shaped excitation light distribution and a distribution of fluorescence prevention light with a local minimum, the fluorescence prevention light in particular is the scanning light that is simultaneously used to examine the sample. It may comprise the same light distribution at the focus both when determining the position of the reference markers and when examining the sample.

Using the laser light as a scanning light to examine the sample may be easily realized, for example, with light-scattering nanoparticles (e.g., gold beads), since these scatter light of a broad wavelength range, so that, in particular, various types of excitation lasers for fluorophores in the sample may also be used to generate the light-scattering signal.

In a embodiment of the method, a drift of the reference marker relative to an optical imaging system of the microscope is calculated from the positions of the at least one reference marker and the drift is compensated by a position correction of a beam deflection unit or by tracking the sample. This may be done, for example, by adding an offset voltage to a control voltage controlling the position of the beam deflection unit or a sample positioning stage, or by adding a corresponding offset to a digitally available position value.

As already explained, the determination of the position of the reference markers is integrated into the measurement sequence of the examination of the sample and is carried out repeatedly between the illumination of the sample at successive illumination positions. Therein, the position of the at least one reference marker may be determined at regular time intervals or after a fixed number of illumination positions. If applicable, however, it is also useful not to determine the position at fixed intervals, or not exclusively, but to adapt it to the respective drift speed of the sample. This procedure is particularly useful after the sample has been placed in the microscope or after (manual) movement of the sample, which initially results in comparatively rapid sample drift. In this phase, the position of the reference marker(s) must be determined at shorter intervals, while after the sample has settled, the drift speed decreases and the time intervals between position determinations may be increased. For this purpose, it is useful to calculate a drift curve from the position determinations and, by extrapolation of this drift curve, to determine the time at which the sample has drifted by a predetermined, maximum acceptable amount. To this end, the drift may be modeled, for example, by an exponential function that decays exponentially.

Adjusting the time intervals for determining the position of the reference marker(s) is particularly important in view of the fact that position determination using the MINFLUX method has a limited catch range, i.e., unambiguous position determination of the reference marker is only possible if the scanning positions are arranged at a distance that is not too great from the actual position of the reference marker. This catch range is typically around 200 nm, and it must be ensured that the reference marker(s) do not leave the catch range between successive position determinations.

However, the frequency with which the examination of the sample is interrupted in order to redetermine the drift by determining the position of the reference markers must be weighed against the time required for this. The more frequently the drift determination is carried out, the less measurement time is proportionally available for the actual examination of the sample. Especially in dynamically changing samples, frequent interruptions of the sample examination are often unacceptable. Therefore, it is advantageous that the drift determination does not exceed a proportion of 5%, particularly 2% and more particularly 1% of the total measurement time. In special cases, it may also be advantageous to additionally use a further, external method for drift determination and/or drift correction; this may also be based on the reference markers located in the sample or also on another controlled variable. Therein, it is acceptable if the external method for drift determination itself does not achieve long-term stability because, for example, it is itself subject to slower drift than the optical system with which the sample is examined. In this constellation, the determination of the position of the reference markers according to the present specification serves to carry out a zero point correction for the external method for drift determination, which can be carried out at longer time intervals than the drift determination of the sample itself.

It is crucial for the feasibility of the method according to the present specification that the position of a given reference marker can be reliably determined repeatedly over a longer period of time, i.e., that the reference marker is subject to only extremely slight or no degradation (for example in the form of photobleaching). For shorter measurements, it may be sufficient if the position determination of a reference marker can be repeated 100 times or 1000 times, but for long-term measurements over several hours or even days, up to 10000 repetitions are required.

Another requirement for the reference markers is that they be in an emitting state at the time of each position determination, so that continuous tracking of the drift can be performed. If the reference markers can assume temporary dark states (as is regularly the case for organic fluorescent dyes), position determination is not possible at these times. Therefore, the situation may arise that the sample drifts during the duration of a dark state of the reference marker to such an extent that the reference marker leaves the catch range. Therefore, the reference markers should ideally have no dark states, but should be in a dark state in which light emission cannot be induced or excited during the measurement for at least no more than 10%, more particularly no more than 5%, of the time.

Due to the stability requirements, single molecules of organic fluorescent dyes, as often used to acquire high-resolution images or trajectories according to a MINFLUX method, are generally not suitable as reference markers for the method according to the present specification. Instead, nanoparticles doped with highly stable fluorophores, in particular nanoparticles doped with ions or complex compounds of the rare earth metals cerium, praseodymium, neodymium, samarium, europium, terbium, dysprosium, erbium, thulium and ytterbium, are particularly considered as fluorescent reference markers. Such nanoparticles are extremely photostable. Alternatively, fluorescent (semiconductor) quantum dots or nanodiamonds exhibiting fluorescent vacancies are also suitable as fluorescent reference markers.

The reference markers do not necessarily have to be fluorescent but may also cause light emission by (elastic or non-elastic) scattering of the scanning light. In this respect, metallic nanoparticles or nanorods also represent reference markers, especially since the light scattering from these metallic particles is not affected by dark states and the particles are also characterized by high chemical and photophysical/photochemical stability. In this context, the contrast of the light emission with respect to the ambient light or with respect to undesired light reflections, which can occur, for example, at optical interfaces in the beam path, in particular at the interfaces of a cover glass, may be improved by selectively detecting the light emission emitted by the reference marker with only one polarization, which is orthogonal to the polarization of the scanning light. This takes advantage of the fact that depolarization or a change in the polarization state of the scanning light usually occurs when light is scattered from nanoparticles. The depolarized or changed polarization state of the scattered light may therefore be detected by an analyzer that blocks the polarization of the scanning light, thus masking the scanning light reflected at interfaces. A simple embodiment of this variant is achieved by arranging crossed linear polarizers in the beam path of the scanning light or in front of the stray light detector for light emission. Alternatively, linearly polarized scanning light may be mirrored into the microscope beam path using a polarization beam splitter. Since the depolarized scattered light, scattered by the reference markers and propagating in the microscope beam path in the opposite direction to the scanning light, has rotated polarization components compared to the scanning light, these components of the scattered light can pass through the polarization beam splitter and be (selectively) detected with a detector arranged downstream of the polarization beam splitter in the transmission direction, while scanning light reflected at optical interfaces in the beam path has the same polarization as the incident scanning light and is reflected again in the back direction by the polarization beam splitter.

Light-scattering nanoparticles in the sample are also used occasionally for other sample stabilization methods, such as the method described in WO 2020/201430 A1. Synergy effects may result from this.

In general, the method according to the present specification requires that reference markers in the sample must first be identified or found and their position determined at least approximately. For this purpose, the sample or a section of the sample may be imaged before the start of the examination, and one or more reference markers may be identified in this image and their position(s) determined approximately. Alternatively, a reference marker may be searched for as part of its initial position determination by scanning the sample with the scanning light until a reference marker is detected based on its light emission. The last scanning position may then serve as a starting point for determining the position of the reference marker according to the MINFLUX method. In an embodiment of the method according to the present specification, the reference markers are found and/or identified in the sample based on the wavelength of their light emission. For this purpose, the wavelength of the light emission of the reference markers must differ from other light signals from the sample. For example, if the sample is stained with a fluorescent dye, its fluorescence emission is red-shifted with respect to the wavelength of the excitation light (Stokes shift), i.e., occurs at longer wavelengths than the excitation wavelength. In contrast, when the same excitation light is (elastically) scattered from the reference markers, a scattered light signal is produced whose wavelength corresponds to that of the excitation, so that the reference markers can be distinguished from the fluorescence from sample based on the wavelength, even if the same excitation light is used to excite the fluorescence and to be scattered from the reference markers.

Similarly, discrimination of the light emission from the reference markers from other signals detected from the sample may be performed based on statistical features of the photon flux of the light emission. For example, light scattering from a metallic nanoparticle used as a reference marker is instantaneous, while the fluorescent, electronically excited state of a fluorescent dye used to stain a structure in the sample decays by fluorescence according to an exponentially decaying distribution with a decay time typically of a few nanoseconds. Thus, temporal separation of scattered light and fluorescence is possible if time-resolved detection techniques (for example, time-correlated photon counting) are used for light detection, as extensively known from the prior art for fluorescence spectroscopy and fluorescence lifetime imaging (FLIM). Also, the light emission of fluorescent reference markers can be temporally distinguished from other fluorescence signals from the sample, provided that the fluorescence lifetimes of the two signals differ significantly.

In addition to the excited state lifetime, other statistical parameters of the photon flux may be used for separation. For example, as shown above, almost all fluorophores exhibit transient dark states into which the fluorophores can temporarily transition. Therefore, even with constant excitation, the photon stream of fluorescence emission is repeatedly interrupted by phases in which no fluorescence emission occurs. The duration of the on-states in which fluorescence emission occurs, the duration of the off-states in which no fluorescence emission occurs, and the average number of fluorescence photons emitted during the duration of an on-state depend strongly on the type of fluorophore in question and are therefore also suitable as parameters for distinguishing between different fluorophores. Accordingly, identification of the reference markers in the sample and differentiation from other light sources in the sample may also be based on these parameters.

To find the reference markers, it may also be possible to take advantage of the fact that the reference markers produce a largely continuous light emission and are stationary; in contrast, the fluorescence from the sample may be subject to stronger temporal changes. In particular, when the sample is examined using a MINFLUX method, different groups of spatially individual dye molecules are activated for localization at different times. As a result, the fluorescence in the sample fluctuates significantly. However, fluctuations in fluorescence may also occur due to dark states and/or movement of structures labeled with fluorescent markers in the sample. Under these circumstances, the reference markers may be identified by correlating multiple images of the sample taken in temporal sequence, since the light emissions from the reference markers add up, while the fluorescence intensity from the other sources is subject to averaging and becomes weaker relative to the signal from the reference markers. For two (grayscale) images $f_1$ and $f_2$ with the pixel indices i and j the correlation amplitude $r_{ij}$ can be calculated according to the following formula:

$$r_{ij} = \frac{\sum_{m,n}[f_1(m+i, n+j) - \bar{f}_1][f_2(m, n) - \bar{f}_2]}{\sqrt{\sum_{m,n}[f_1(m, n) - \bar{f}_1]^2 \sum_{m,n}[f_2(m, n) - \bar{f}_2]^2}}$$

Here $\bar{f}_1$ and $\bar{f}_2$ are the average gray values of the images $f_1$ and $f_2$, the summations are done over all pixels of the images. The correlation can be calculated in an analogous way for more than two images. The reference markers may be determined by thresholding from the correlation amplitude $r_{ij}$ and if applicable further, e.g. morphological criteria such as form and/or size.

Although the method according to the present specification can be carried out with only a single reference marker whose position is determined repeatedly, in practice it is usually advantageous to carry out the position determination on several reference markers. If the drift of several reference markers is recorded in parallel and separately, the accuracy of the drift determination can be improved by averaging. In addition, the method becomes more robust in that examination of the sample may continue even if one or more reference markers fail for further position determinations, for example as a result of photobleaching. Also, by comparing the position determinations of multiple reference markers, it can be detected when a reference marker detaches from its binding site and moves relative to the sample and the other reference markers. Independent position determination of multiple reference markers further allows the drift of an (arbitrary) point in the sample to be determined from the drift of multiple reference markers by interpolation. Thus, not only a correlated drift movement of the whole sample or of an object in the sample, but also a morphological deformation of an object in the sample can be detected and corrected.

Even if the drift determination is carried out in parallel on several reference markers, the positions of all these reference markers do not necessarily have to be determined each time the sample examination is interrupted; it is also possible to locate several reference markers alternately. In this case, the positions of the other reference markers, which are not localized, respectively, can be extrapolated using the position determinations of those reference markers for which a position determination has been made. In this way, the non-localized reference markers can be kept within the catch range of the MINFLUX localization for subsequent position determinations.

When alternately determining the position of different reference markers, these may be localized in a fixed sequence or in a random sequence. In a particularly advantageous embodiment of the method, however, the reference marker to be localized is selected depending on the situation based on the last illumination position of the focused laser light. In this case, the closest reference marker in each case may be selected or also a reference marker whose distance from the last illumination position does not exceed a predetermined amount of particularly 30 µm, more particularly 20 µm and even more particularly 10 µm. In this embodiment, the deflections of the beam are minimized, resulting in short positioning times of the focused laser light in the sample and keeping the time required for determining the position of the reference markers low.

The marking of the sample with the reference markers can be carried out in a variety of ways. In an embodiment of the method according to the present specification, the marking of the sample is carried out by attaching reference markers to or in a sample carrier, in particular a microscope slide or a cover glass. For this purpose, fluorescent or light-scattering nanoparticles are chemically bonded to the surface of the microscope slide or coverslip or fixed by electrostatic interactions before the sample is applied to the microscope slide or coverslip. Although this way of marking the sample is common in laboratory practice, samples prepared in this way do not always provide satisfactory results with regard to the adhesion of the nanoparticles to the surface. Also, setting the desired density of nanoparticles in the sample and, in particular, their reproducibility is difficult.

For use in a method according to the present specification, slides or cover slips which are already provided with reference markers during production are therefore particularly suitable. The nanoparticles can be firmly bonded to the material of the carrier or even embedded in it. However, not only nanoparticles can be used as reference markers, but in principle all markers that can be localized in at least one spatial direction using a MINFLUX method, i.e., not only point-shaped markers but also linear or even flat markers. Point-shaped markings allow position determination in three spatial directions, linear markings allow two position determinations in directions perpendicular to the line, and a flat marking still allows position determination perpendicular to the plane.

Structures that are produced on or in the material by means of mechanical engraving or laser marking and that form a scattering center when illuminated are also suitable as reference markers. Light-scattering reference markers can also be produced by lithographically structuring the glass surface. A major advantage of sample carriers prepared in this way is that the reference markers can be arranged reproducibly in regular arrays and at defined distances, thus ensuring that there is always a reference marker within the scanning area whose position can be determined. In particular, laser marking makes it possible to create structures not only on the surface but also in the glass, so that the position of the reference markers is not necessarily limited to one plane (the glass surface). While the position determination of the reference markers in the z-direction, i.e., in the direction of the optical axis, is limited to the catch range of the MINFLUX localization if all reference markers are located in the same plane, a position determination of reference markers over a much larger range can be realized with reference markers arranged in different depths.

Sample carriers provided with markers are known for other purposes and are partly commercially available. In this respect, the present specification comprises not only the method described and illustrated with various embodiments, but also the use of a sample carrier having reference markers in a method according to the present specification.

As an alternative to placing reference markers on or in a sample carrier, reference markers may also be coupled to an object in the sample, for example a cell. The reference markers are then no longer necessarily stationary with respect to the entire sample, but with respect to the object to which they are coupled. In this embodiment, the determination of the position of the reference markers no longer only detects a drift of the sample as a whole, but alternatively or additionally a drift or active movement of the object or cell to which the reference markers are coupled. In many applications where structures within a cell are investigated, this is an advantageous embodiment of the method, since passive and active movements of the cell have as much of a disruptive effect on the examination as a drift of the entire sample. This embodiment of the method also allows not only coordinated movement of the sample or cell to be detected as drift, but also morphological changes occurring due to growth or cell division processes during the examination, for example stretching or compression. For this purpose, the drift at any position in the sample can be determined from the drift of several reference markers located in the vicinity of the respective position by interpolation. The reference markers then form a (time-varying) two- or three-dimensional mesh on which coordinates of points between the mesh points can be interpolated by means of warping algorithms.

In special cases, an object in the sample may also comprise intrinsic particles suitable as reference markers. An example of this is the hemozoin pigments formed during hemoglobin degradation by the malaria pathogen *Plasmodium falciparum*, which are found in infected erythrocytes. These pigments are birefringent, which is why polarization contrast is particularly suitable for determining their position.

In addition to the method according to the present specification described in various embodiments, the present specification also comprises a light microscope comprising an objective, a light source for the scanning light, beam shaping means for forming an intensity distribution of the scanning light in a sample, the intensity distribution comprising a local intensity minimum, a scanning device for positioning the scanning light in the sample, and a detector for detecting a light emission from reference markers in the sample. The light microscope is characterized in that it comprises a control unit configured to perform a method according to the present specification. To correct the drift of the sample determined at a reference marker, the light microscope particularly comprises a sample stage with a drive with which the drift of the sample can be compensated by tracking.

Advantageous embodiments of the present specification result from the claims, the description and the drawings and the associated explanations to the drawings. The described advantages of features and/or combinations of features of the present specification are merely exemplary and may have an alternative or cumulative effect.

With regard to the disclosure content (but not the scope of protection) of the original application documents and the patent, the following applies: Further features can be found in the drawings—in particular the relative arrangements and effective connections shown. The combination of features of different embodiments of the present specification or of features of different claims is also possible in deviation from the selected back relationships of the claims and is hereby suggested. This also applies to such features which are shown in separate drawings or are mentioned in the description thereof. These features can also be combined with features of different claims. Likewise, features listed in the claims may be omitted for further embodiments of the present specification, but this does not apply to the independent claims of the granted patent.

The reference signs contained in the claims do not represent a limitation of the scope of the objects protected by the claims. They merely serve the purpose of making the claims easier to understand.

DESCRIPTION OF THE FIGURES

Figure 1:
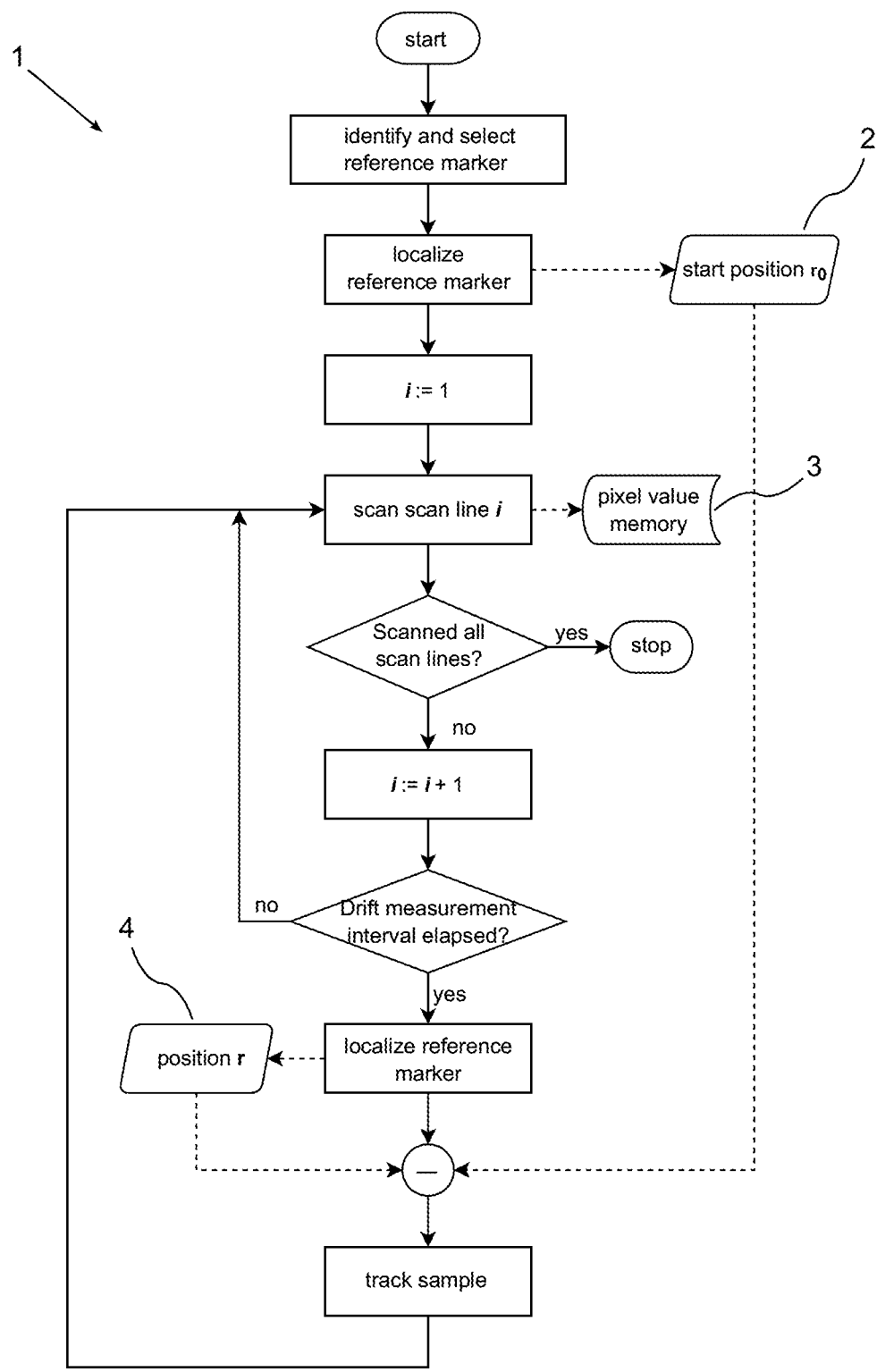
FIG. 1 shows an embodiment of the method according to the present specification in a flow chart.

FIG. 1 shows a flow chart 1 of an embodiment of the method according to the present specification, Zo in which the sample is examined by a laser scanning method, for example by confocal or STED microscopy. For this purpose, the sample or a structure of interest in the sample is stained with a fluorescent marker. In flow chart 1, dashed lines indicate the flow of data.

Initially, a reference marker is identified in the sample at which the drift determination is to be performed by repeatedly determining its position during the examination of the sample. A reference marker may be identified, for example, in an overview image of the sample based on a characteristic shape or a specific light emission, and its position in the sample may be determined at least approximately. Metallic nanoparticles, for example, can be identified in a reflected light image of the sample by their bright, point-like scattered light signals.

Such a reflected light image may, for example, be overlaid with a scanning fluorescence image of the sample so that the position of the reference markers relative to structures of the sample is shown from the overlay. From this image, a user may, for example, select one or more reference markers to be used for drift determination. Such a selection may be made, for example, by marking areas on a graphical user interface, e.g., by defining and moving a frame via mouse or touch screen interaction.

When the reference marker is selected, its position is determined for the first time using a MINFLUX method to determine a start position $r_0$ 2, which serves as a reference position for drift determination in subsequent position determinations of the reference marker. The subsequent examination of the sample is performed line by line in the embodiment shown; at the beginning a line counter is i is set on the first scan line and this line is scanned point by point, wherein a fluorescence is detected for each pixel of the line and the intensity of the fluorescence is stored in a pixel value memory 3. In the next step, it is checked whether all scan lines have been scanned, i.e., whether the examination of the sample has been completed. If this is the case, the method is terminated, otherwise the line counter i is incremented.

In the next step, it is checked whether a position determination of the reference marker and a drift correction should be carried out, for which purpose the time elapsed since the last position determination of the reference marker is determined. If a (predefined) drift measurement interval is reached, the position of the reference marker is determined again using a MINFLUX method. Alternatively, the position determination of the reference marker may also be repeated after a predefined number of scanned scan lines.

From the difference of the current position r 4 and the start position $r_0$ 2 of the reference marker, a drift correction is calculated, by which the sample is tracked so that the drift is corrected; then the examination of the sample is continued with the scanning of the next scan line i.

Figure 2:
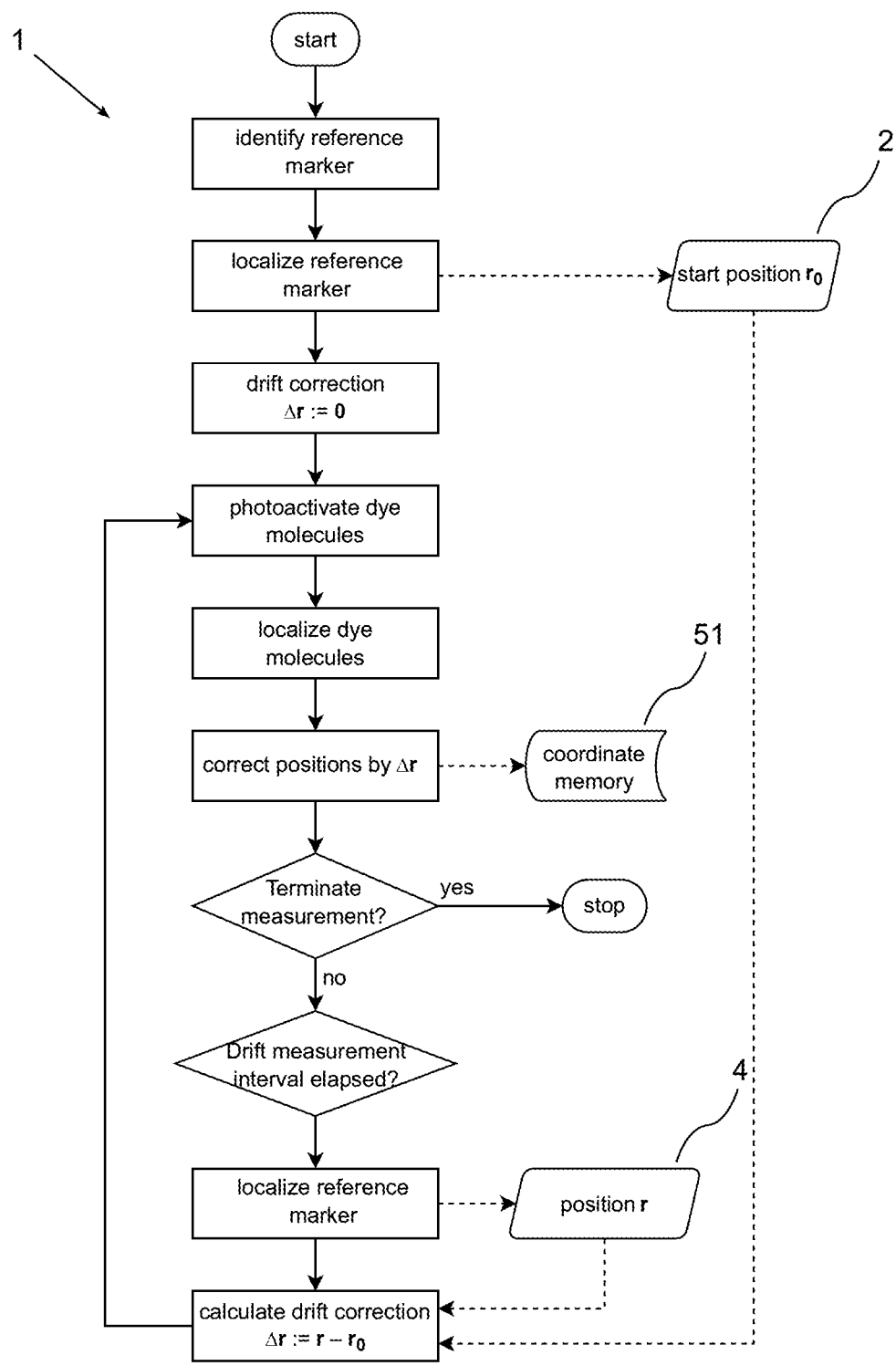
FIG. 2 shows a further embodiment of the method according to the present specification in a flow chart.

FIG. 2 shows a flow chart 1 of an embodiment of the method according to the present specification, in which the examination of the sample is carried out using a MINFLUX method, in contrast to the embodiment shown above. For this purpose, the sample or a structure of interest in the sample is labeled with a fluorescent dye that can be transferred between a fluorescent state and a non-fluorescent dark state in at least one direction in a light-induced manner.

As before, a reference marker is identified in the sample at the beginning of the examination, on which the drift determination is to be performed by repeated position determination, and its position is determined for the first time with a MINFLUX method in order to determine a start position $r_0$ 2 is determined. The drift correction Δr is initialized with the value 0.

In the next step, (only) a small number of molecules of the fluorescent dye with which the sample is labeled are converted to the fluorescent state by photoactivation. The density of the fluorescent dye molecules is adjusted so that there is only one fluorescent dye molecule at most in a diffraction-limited volume.

In the next step, the localization of the previously photoactivated dye molecules occurs according to a MINFLUX procedure. The localization comprises an initial determination of the approximate positions of the dye molecules as position start values, which may be determined by systematic scanning of the sample (or a section of the sample) or by taking an epifluorescence image of the sample. Starting at the respective localization start value of a dye molecule, its position is localized stepwise with increasing accuracy according to the MINFLUX method, for which purpose the dye molecule is scanned with an intensity distribution of excitation light comprising a local minimum at several scanning positions and an improved position r of the dye molecule is determined from fluorescence intensities detected at these scanning positions. In this embodiment of the method according to the present specification, the positions of the dye molecules are subsequently corrected by the value of the drift correction Δr and then stored in a coordinate memory 51.

If a sufficient number of single molecule localizations is reached, the measurement may be stopped and terminated at this point. Various criteria may serve as termination criteria; for example, the measurement may be terminated when a predefined or predefinable number of single molecule localizations occurs or a predefined signal-to-noise ratio is reached. It is also possible to have the operator terminate the measurement interactively.

As in the previously described embodiment, it is now checked whether a position determination of the reference marker and a drift correction are to be carried out, for which purpose the time elapsed since the last position determination of the reference marker is determined. If a (predefined) drift measurement interval is reached, the position of the reference marker is determined again using a MINFLUX method. From the difference between the current position r 4 and the start position $r_0$ 2 of the reference marker, an updated drift correction is Δr is calculated. Subsequently, the examination of the sample is continued by again photoactivating and localizing a small number of dye molecules.

Figure 3:
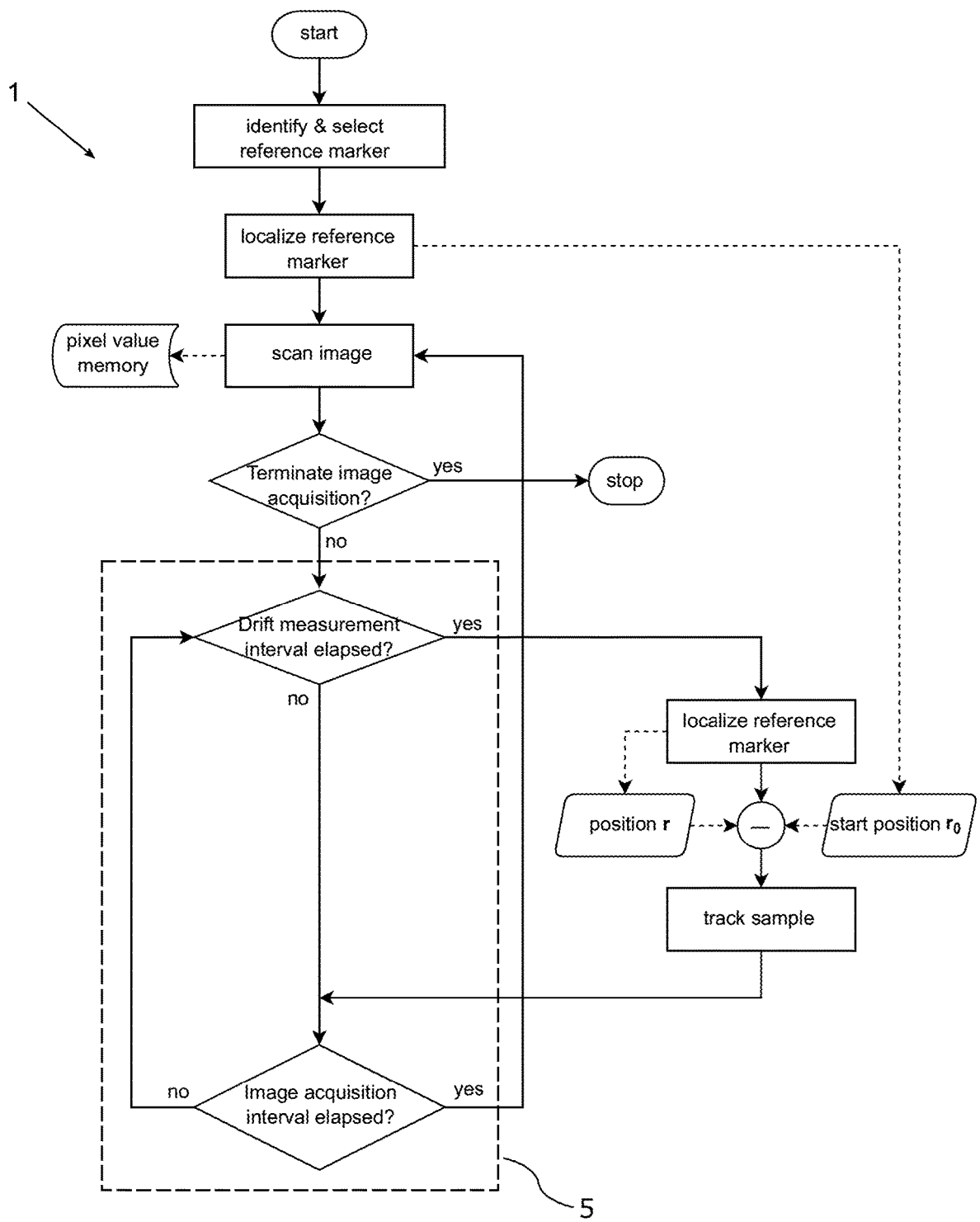
FIG. 3 shows a further embodiment of the method according to the present specification in a flow chart.

FIG. 3 shows the flow chart 1 of a further embodiment of the method according to the present specification. As in the embodiment shown in FIG. 1, the sample is also examined here using a laser scanning method, for example by means of confocal or STED microscopy. The embodiment of the method shown here is suitable for repeated examinations of the sample over extended periods of hours or even days. In this case, the drift determination is again integrated into the sample examination, but in this case it is not performed between successive image lines, but during the pauses between successive acquisitions of an image or image stack of the sample. For this purpose, a check is made after each image acquisition to determine whether the drift measurement interval has elapsed. If this is the case, drift is determined at the reference markers and the sample is tracked, as shown in FIG. 1. The drift measurement interval may be predetermined or fixed, or it may be determined dynamically from the previously determined drift values. A waiting loop 5 is then run through until the image acquisition interval has expired; a new image acquisition is then started. During the repeated run through the waiting loop, it is further checked whether the drift measurement interval has expired and, if necessary, a further drift determination and sample tracking is carried out.

Figure 4:
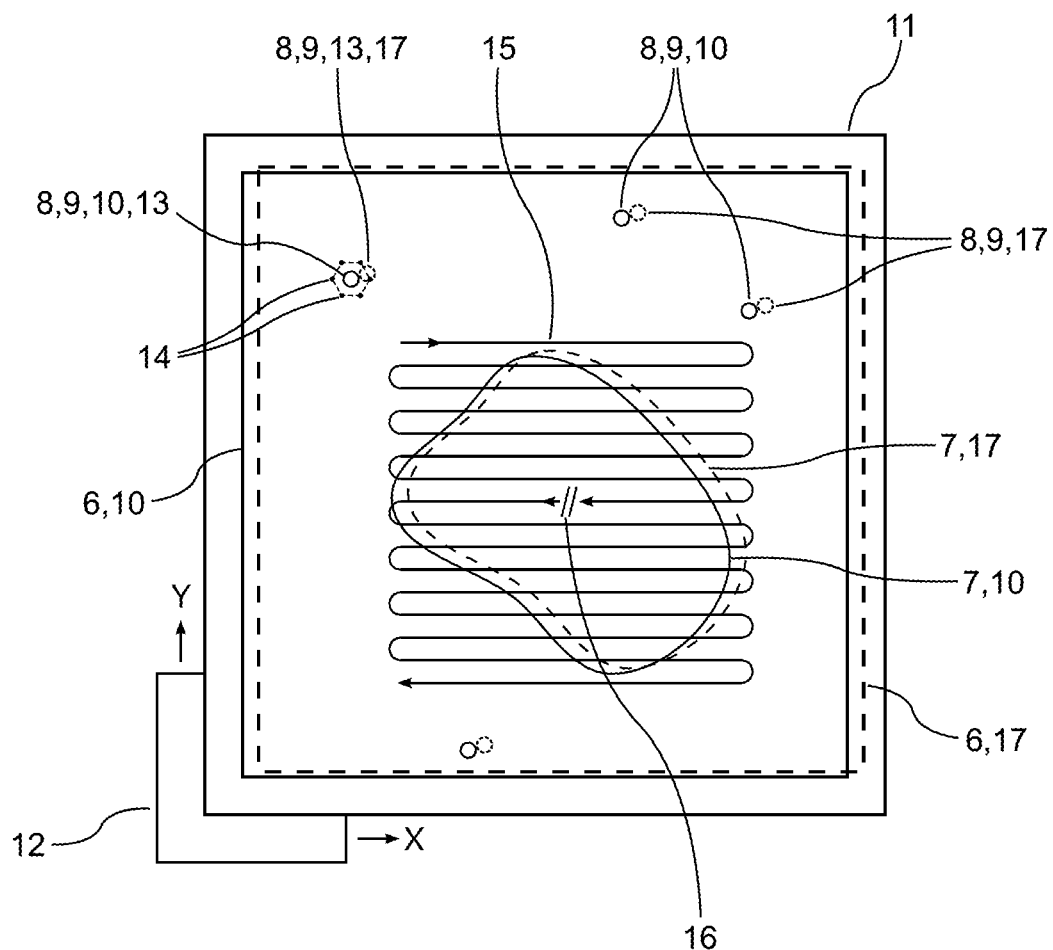
FIG. 4 shows a schematic diagram of a method according to the present specification.

In FIG. 4 the method according to the present specification is shown schematically. A sample 6 contains a cell 7 to be examined and reference markers 8, in this case in the form of light-scattering metallic nanoparticles 9. The cell 7 is examined by confocal laser scanning microscopy, i.e., by scanning the cell 7 line by line with focused laser light in a meandering pattern. The sample 6 is arranged at a starting position 10 on a sample stage 11 with a drive 12, with which the sample 6 is moved in x- and y-direction. If a drift correction is to take place in three spatial directions, an additional adjustment possibility is to be provided in the z-direction perpendicular to the drawing plane.

Initially, the reference markers 8 in the sample 6 are identified and one of these reference markers 13 is selected to perform the drift determination. The selection is particularly made in such a way that the reference marker 13 is located in the vicinity of, but not within, the area of sample 6 to be investigated. A first MINFLUX localization of the reference marker 13 is now carried out, for which purpose it is illuminated with an intensity distribution of scanning light comprising a local minimum at several scanning positions 14 (of which only two are provided with reference signs here as an example) arranged closely around the marker, and an exact localization of the reference marker 13 is carried out from the scattered light intensities registered at the scanning positions 14. This first localization defines the starting position 10 of the reference marker 13 and thus of the sample 6 or of the cell 7 in the sample 6. Subsequently, the image acquisition of the cell 7 is carried out by means of raster scanning, for which the sample 6 is scanned line by line—in this case in a meandering manner—starting with the first scan line 15. As soon as the time elapsed since the first or the last position determination has reached the drift measurement interval, an interruption 16 of the raster scanning occurs and a new MINFLUX localization of the reference marker 13 is performed, which provides a drifted position 17 of the reference marker 13 with respect to the initial position 10. For correction, the sample is now tracked by the difference between the drifted position 17 and the initial position 10 using the drive 12 of the sample stage 11. The image acquisition is then continued by means of raster scanning.

Figure 5:
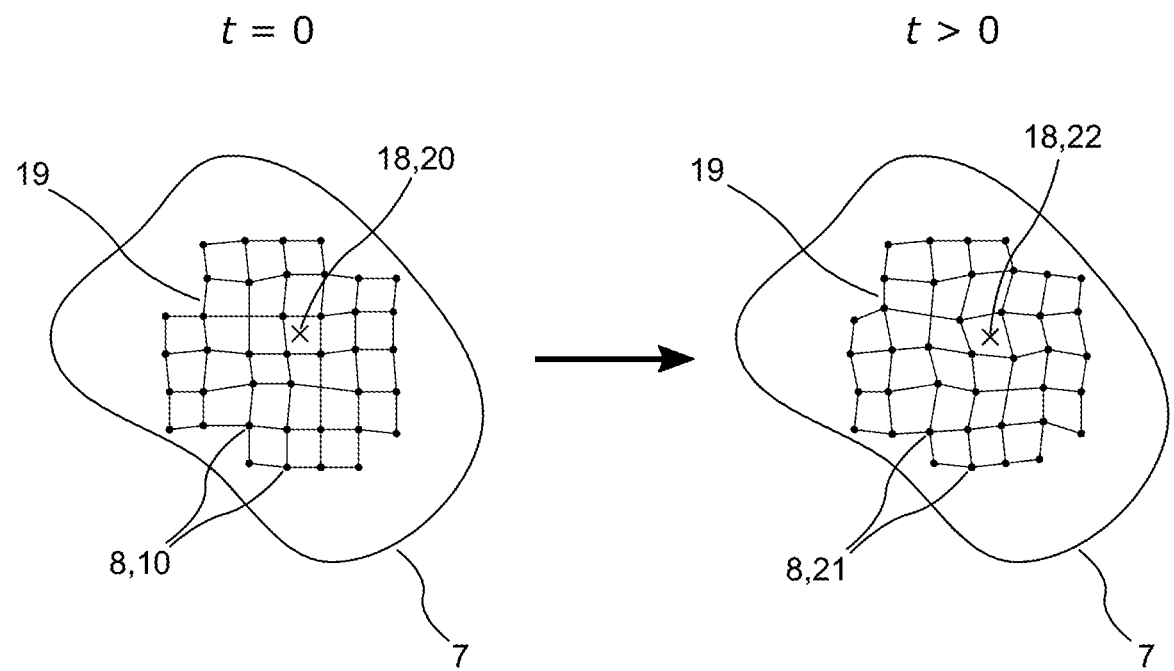
FIG. 5 shows a drift determination by interpolation from the positions of several reference markers.

FIG. 5 sketches how the drift of an arbitrary point 18, whose position itself cannot be determined by MINFLUX localization, can be determined by interpolation from the positions of several reference markers 8. For this purpose, the cell 7 is marked with several reference markers 8, which in the example shown are arranged along an approximately regular grid 19. (For the sake of clarity, only two of the reference markers are provided with reference signs in the figure as an example). At the beginning of the examination, i.e., at the time t=0 the reference markers 8 are in initial positions 10, which are determined by a first MINFLUX localization of all reference markers 8 before the start of the examination. The initial position 20 of the point 18 in the sample whose drift is to be corrected over the examination period is determined relative to the initial positions 10 of the reference markers 8 surrounding the point 18 by interpolation.

At a later time t>0 during the examination of the sample, a deformation of the cell 7 has taken place, for example as a result of growth of the cell 7. As a result, the positions 21 of the reference markers 8 have changed, wherein the changes in position are not uniform but may differ from reference marker 8 to reference marker 8. A new MINFLUX localization of the reference markers 8 (or at least of the reference markers surrounding the point 18) now provides a set of positions from which the changed position 22 of the point 18 can be interpolated.

The MINFLUX procedure performed for localization of the reference markers may include (if applicable, after selection of the reference markers from an overview image, e.g., an overlay of an incident light image indicating the coarse positions of the reference markers and a raster fluorescence image of the sample structures marked with fluorescent markers) a pre-localization step in which an initial position estimate of a reference marker is determined. For this purpose, for example, a projection of the detector pinhole may be shifted circularly in the sample plane while the excitation light distribution remains stationary relative to the sample (so-called pinhole orbit). In this way, the initial position estimate of the reference marker can be determined in the lateral direction, i.e., in the sample plane perpendicular to the optical axis of the excitation light beam. Subsequently, a so-called 2D MINFLUX procedure may be performed to precisely localize the reference marker.

If 3D localization of the reference marker is required (which is typically the case if the structures in the sample marked with fluorescent dyes are also to be imaged in three dimensions), another pre-localization method may have to be used, since the pinhole orbit method does not provide information about the axial position of the reference marker. For example, for 3D pre-localization, especially of light-scattering reference markers, the convergence of position estimation starting from the initial position of the excitation light distribution may be used. For this purpose, for example, a large number of iterative MINFLUX localization sequences may be performed on a point cloud around the position of the reference marker estimated from the overview image. In the localization sequence, the central minimum of the excitation light distribution is first placed successively at the points of an illumination pattern arranged around a random point of the point cloud and the photon counts are determined for each point. From this, a new position estimate is calculated and in the next step, the illumination pattern is placed around the new position estimate. This sequence is performed for each of the points until the position estimate diverges (which is the case if the initial point is outside the catch range of the reference marker) or converges (if the initial point is in the catch range). The closer the position of the initial point is to the actual position of the reference marker, the faster this position estimate converges. From the trajectories of the localization sequences, the reference marker may be pre-localized, using a 3D illumination pattern and a three-dimensional point cloud of initial points both laterally and axially.

A 3D MINFLUX method may then be applied to determine the position of the reference marker with high resolution.

The pre-localization method described requires significantly more localization steps than the MINFLUX method for localizing the sample structures, in particular because of its lower effectiveness. The stronger exposure of the reference markers that occurs is tolerable due to their high photostability. Due to the additional time required, the 3D pre-localization method is particularly only used for the initial determination of the reference marker position, while for further position determinations in the context of drift determination, in particular, no pre-localization is used, but instead a 3D MINFLUX method is applied directly. For the 3D MINFLUX method in the subsequent measurements, the position of the reference marker determined in the respective previous step may be used as the starting value, in particular instead of a pre-localization.

For the described pre-localization from the convergence of the position estimates, in particular, unlike conventional MINFLUX methods, no prior information about the background signal is required. However, in order to improve the robustness and the speed of convergence, the illumination pattern used may in particular comprise a central position corresponding exactly to the previous position estimate, the background signal being estimated by the photon number detected at this central position (in particular scaled by a factor).

Figure 6:
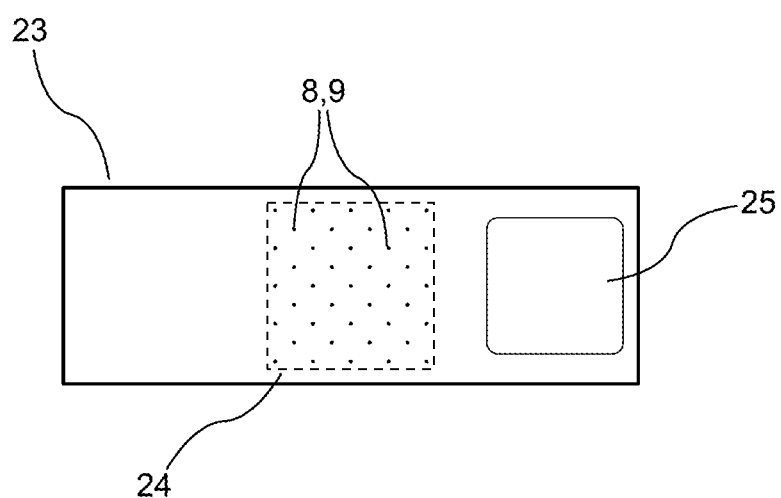
FIG. 6 shows a sample carrier for use in a method according to the present specification.

FIG. 6 shows a sample carrier 23 consisting of glass with a preparation region 24, within which the sample carrier 23 comprises reference markers 8 suitable for use in a method according to the present specification. Such reference markers 8 may be, for example, light-scattering, fixed metallic nanoparticles 9; however, it is also possible to create reference markers, for example, by laser engraving in the form of point-shaped scattered light centers on the surface or in the glass volume. In the example shown, the sample carrier in the preparation area comprises a regular, hexagonal arrangement of reference markers 8. The sample carrier 23 may have other features such as a labeling field 25.

In the preparation region 24, a sample to be examined may be applied to the sample carrier 23. It is advantageous that the sample is fixed on the surface of the sample carrier 23 to ensure a fixed positional relationship to the reference markers 8. For example, cells can be grown on the surface of the sample carrier 23, or they can be chemically fixed to the glass surface.

Figure 7:
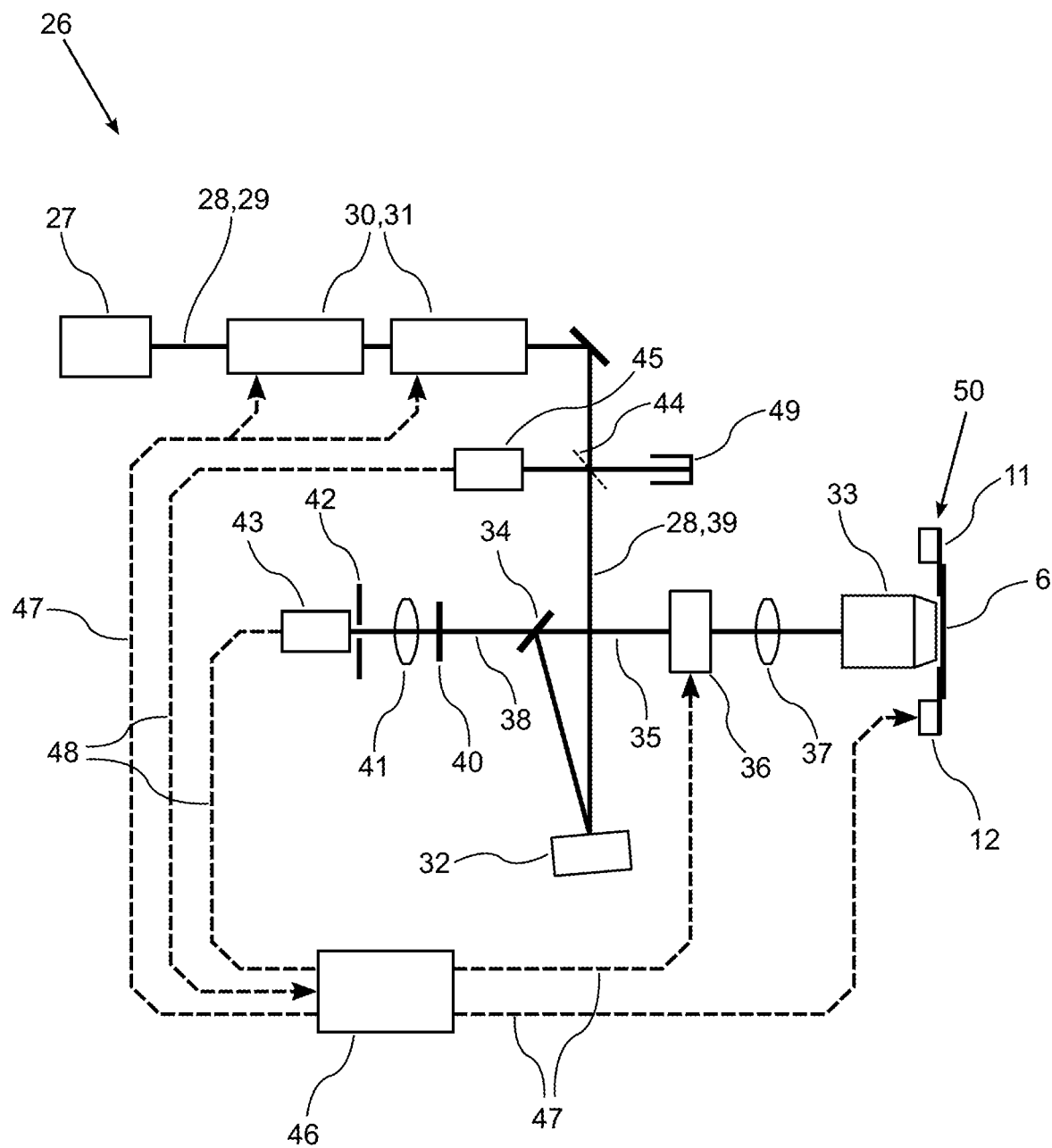
FIG. 7 shows a light microscope according to the present specification according to a first embodiment.

FIG. 7 schematically shows the setup of a light microscope 26 for carrying out the method according to the present specification. The light source 27 provides scanning light 28, which on the one hand causes fluorescence excitation of fluorescent particles present in the sample 6, and on the other hand is scattered by light-scattering reference particles present in the sample 6.

The light beam 29 of the scanning light 28 passes through two successively connected beam deflection devices 30, here designed as electro-optical deflectors (EOD) 31 for deflecting the light beam 29 in the horizontal and vertical directions, respectively. A portion of the scanning light 28 is reflected out of the beam path at the partially transparent mirror 44; this partial beam is collected in a beam trap 49. The wavefront of the portion of the scanning light 28 transmitted at the partially transparent mirror 44 is shaped by a liquid crystal modulator (spatial light modulator, SLM) 32 in such a way that, when subsequently focused by the objective 33, an intensity distribution of the scanning light 28 comprising a local intensity minimum results in the sample 6. The light beam reflected from the liquid crystal modulator 32 is coupled into a main beam path 35 of the light microscope 26 by a beam coupler 34. The scanning light 28 is directed through a scanner 36 and through a scan lens 37 into the rear aperture of the objective 33, which focuses the scanning light 28 into the sample 6, which is supported on a sample stage 11 with a drive 12. The sample stage 11 with the drive 12 form the sample positioning unit 50.

In the configuration shown, the galvanometer-based scanner 36 is used for comparatively slow coarse positioning of the focused scanning light 28 in the sample 6, but this is possible over a large image field, while the EODs 31 are used for fast positioning of the intensity minimum for scanning the reference markers. In this regard, the EODs 31 allow positioning at high speed, but with a positioning range limited to a few micrometers. The fluorescence 38 of the fluorescent particles and the scattered light 39 of the reference particles received by the objective 33 from the sample 6 propagates along the main beam path 35 in the opposite direction to the scanning light 28. The fluorescence 38, which comprises a shifted wavelength relative to the scanning light 28, passes through the beam coupler 34, is cleaned up by a filter 40, focused by a lens 41 through a confocal pinhole 42, and detected by a fluorescence detector 43 located behind the pinhole 42. In contrast, the scattered light 39 from the reference particles received by the objective 33 from the sample 6 has the same wavelength as the scanning light 28 and is therefore reflected out of the main beam path 35 by the beam coupler 34. It continues to travel in the opposite direction to the scanning light 28 and is directed by the partially transparent mirror 44 onto the scattered light detector 45.

In accordance with the present specification, the light microscope 26 comprises a control unit 46 that generates control signals 47 to drive the scanner 36, the EODs 31, and the drive 12, and receives detector signals 48 from the fluorescence detector 43 and scattered light detector 45. The control unit 46 is configured to position the scanning light 28 at individual fluorescent particles using the scanner 36 and to locate individual particles in the sample 6 by repeatedly scanning them with the scanning light 28 in a close range and determining their positions from the amounts of light of fluorescence 38 detected at the scanning positions with the fluorescence detector 43.

Therein, the control unit 46 periodically interrupts the localization of the individual fluorescent particles in order to perform a position determination of at least one reference marker according to the MINFLUX method. For this purpose, the reference marker is scanned with the scanning light at a plurality of scanning positions in a close range and its position is calculated from the light quantities of the scattered light 39 detected at the scanning positions with the scattered light detector 45. The drift calculated from the difference with respect to the initial position of the reference marker is compensated by tracking the sample 6 in the opposite direction by controlling the drive 12 of the sample stage 11.

Figure 8:
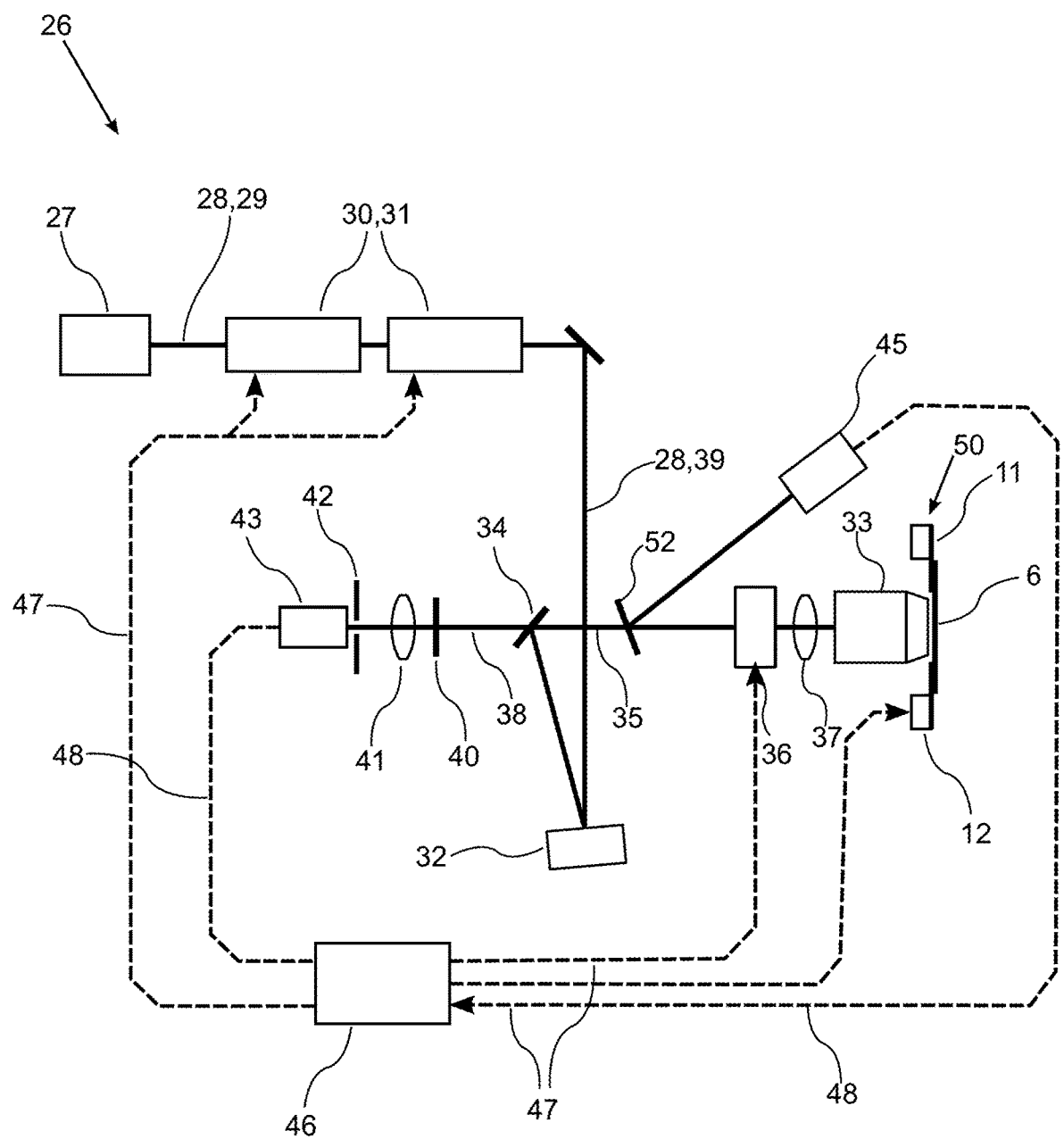
FIG. 8 shows a light microscope according to the present specification according to a second embodiment.

The embodiment of the light microscope 26 shown in FIG. 8 differs from the light microscope 26 shown in FIG. 7 by the position of the scattered light detector 45 in the beam path, and in particular by the type of coupling out of the scattered light 39. According to FIG. 8, a beam splitter 52 is arranged in the main beam path 35 between the beam coupler 34 and the scanner 36, which beam splitter 52 comprises a reflecting surface whose surface normal is arranged at a small angle (i.e., in particular 10° or less, particularly 5° or less, more particularly 1° or less) to the beam propagation direction in the main beam path 35. This angle is shown larger in FIG. 8 for clarity than in typical embodiments of the light microscope 26. Through the beam splitter 52, a small portion (e.g., about 5%) of the scattered light 39 is decoupled from the main beam path and directed to the scattered light detector 45, which is designed in particular as a photomultiplier. Since the beam splitter 52 is located on the objective side of the beam coupler 34 and the beam splitter 52 reflects light in particular independent of wavelength, a portion of the fluorescent light in particular is also coupled out. However, this portion is only small due to the small angle of the beam splitter 52 to the main beam path 35.

The beam splitter 52 is designed in particular as a so-called beam sampler. This is a component made of a material with a higher refractive index than air (e.g., glass), which has a flat reflecting surface (which in particular reflects independently of wavelength and polarization). In particular, a second surface opposite the reflective surface is provided with an anti-reflective coating to prevent beam doubling. Additionally, the second surface may be disposed at a small angle to the reflective surface so as to avoid interference within the device. As an alternative to a beam sampler, any reflecting surface, e.g., of a component already present in the beam path, may be used to couple out the scattered light, e.g., a window or the like.

The arrangement of the beam splitter 52 close to the objective 33 is advantageous because the wavefront of the detected scattered light 39 is thereby distorted as little as possible by optical elements in the beam path (e.g., the liquid crystal modulator 32), which improves the position determination of the reference markers.

In order to obtain a particularly space-saving and cost-effective arrangement, a lens (not shown in FIG. 8) which is present in the main beam path 35 anyway may be used to focus the scattered light 39 onto the scattered light detector 45. That is, the beam splitter 52 is not arranged in the collimated beam path. Such a lens may, for example, be a part of an optical relay or telescope that images the active surface of the liquid crystal modulator 32 into the pupil of the objective 33.

LIST OF REFERENCE SIGNS

1 Flow chart
2 Start position
3 Pixel value memory
4 Position
5 Waiting loop
6 Sample
7 Cell
8 Reference marker
9 Nanoparticles
10 Initial position
11 Sample stage
12 Drive
13 Reference marker
14 Scanning position
15 Scan line
16 Interruption
17 Drifted position
18 Point
19 Grid
20 Initial position
21 Position
22 Position
23 Sample carrier
24 Preparation region
25 Labeling field
26 Light microscope
27 Light source
28 Scanning light
29 Light beam
30 Beam deflection device
31 Electro-optical deflector (EOD)
32 Liquid crystal modulator
33 Objective
34 Beam coupler
35 Main beam path
36 Scanner
37 Scan lens
38 Fluorescence
39 Scattered light
40 Filter
41 Lens
42 Pinhole
43 Fluorescence detector
44 Partially transparent mirror
45 Scattered light detector
46 Control unit
47 Control signal
48 Detector signal
49 Beam Trap
50 Sample positioning unit
51 Coordinate memory
52 Beam splitter

The invention claimed is:

1. A method for light microscopic examination of a sample marked with reference markers in a light microscope, wherein the examination comprises sequential illumination of the sample with focused laser light at a plurality of illumination positions, wherein the examination of the sample is repeatedly interrupted between an illumination at the illumination positions, and a position of at least one reference marker is determined according to a MINFLUX method, wherein the MINFLUX method comprises:

illuminating the at least one reference marker for a position determination with an intensity distribution of a scanning light inducing or modulating a light emission of the reference marker, the intensity distribution comprising a local minimum, at a plurality of scanning positions arranged in a close range around the reference marker, and determining the position of the at least one reference marker from light emissions of the reference marker detected for the plurality of scanning positions of the scanning light.

2. The method according to claim 1, wherein the light emission of the reference marker is a fluorescence or phosphorescence, a Rayleigh or Raman scattered light, a Coherent Anti Stokes Raman Scattering scattered light, or a light emission generated by the scanning light by frequency multiplication of or by frequency mixing.

3. The method according to claim 1, wherein a polarization orthogonal to a polarization of the scanning light is selectively detected from a light emission of the reference marker.

4. The method according to claim 1, wherein the laser light for examining the sample is simultaneously the scanning light for determining the positions of the at least one reference marker.

5. The method according to claim 1, wherein a drift of the at least one reference marker with respect to an optical imaging system of the light microscope is calculated from the positions of the at least one reference marker and that the drift is compensated by a position correction of a beam deflection unit or by tracking the sample with a sample positioning unit.

6. The method according to claim 1, wherein the position of the at least one reference marker is determined at regular time intervals.

7. The method according to claim 1, wherein the position of the at least one reference marker is redetermined when a position of the reference marker determined by a temporal extrapolation of a drift curve generated from the previous position determinations of the reference marker has changed by a predetermined or predeterminable amount.

8. The method according to claim 1, wherein a measurement duration for determining the position of the at least one reference marker does not exceed a proportion of 5% of a total measurement duration for examining the sample.

9. The method according to claim 1, wherein the position of the at least one reference marker can be determined several times before a further position determination can no longer be carried out.

10. The method according to claim 1, wherein during the examination of the sample the reference markers are in a dark state in which light emission cannot be induced or excited not more than 10% of the time.

11. The method according to claim 1, wherein the reference markers are light-scattering nanoparticles or fluorescent nanoparticles.

12. The method according claim 1, wherein the reference markers are found and/or are identified as reference markers in the sample based on a wavelength of their light emission.

13. The method according to claim 1, wherein the reference markers are found and/or identified as reference markers in the sample based on statistical features of a photon flux of their light emission.

14. The method according to claim 13, wherein the reference markers are found and/or identified as reference markers in the sample based on a lifetime of their light emission.

15. The method according to claim 1, wherein the reference markers are found and/or identified as reference markers in the sample by correlating a plurality of images of the sample.

16. The method according to claim 1, wherein the position determination is carried out alternately or in the same localization step with different reference markers.

17. The method according to claim 16, wherein for the position determination of a reference marker, in each case a reference marker is selected in the sample which has a distance of not more than 30 µm from the last illumination position of the focused laser light.

18. The method according to claim 16, wherein a drift of a point in the sample is determined by interpolation from a drift of several reference markers.

19. The method according to claim 1, wherein the examination of the sample is performed by capturing images of the sample using a laser scanning method.

20. The method according to claim 19, wherein the positions of the at least one reference marker are determined with at least an accuracy that corresponds to a spatial resolving power of the laser scanning method.

21. The method according to claim 1, wherein the examination of the sample comprises a determination of positions of individual, spatially separated particles in the sample using the MINFLUX method.

22. The method according to claim 21, wherein the positions of the at least one reference marker are determined with at least an accuracy that corresponds to the accuracy of the position determination of the particles.

23. The method according to claim 21, wherein examining the sample comprises calculating high-resolution images of the sample and/or trajectories of the individual particles from the positions of the individual particles.

24. The method according to claim 21, wherein a drift of the reference marker(s) relative to an optical imaging system of the light microscope is calculated from the positions of the at least one reference marker, and that the positions of the individual particles determined according to the MINFLUX method are corrected by an amount of the drift.

25. The method according to claim 1, wherein the reference markers are stationary with respect to a sample carrier or bound to a sample carrier or embedded in a sample carrier.

26. The method according to claim 25, wherein the reference markers are formed as engravings or as laser markings on or in the sample carrier.

27. The method according to claim 25, wherein the reference markers are formed by a surface structuring of the sample carrier.

28. The method according to claim 1, wherein the reference markers are stationary with respect to an object or a structure in the sample or are bound to an object or a structure in the sample.

29. The method according to claim 28, wherein the reference markers are intrinsic components of the object.

30. The method according to claim 1, wherein a drift determined by the position determination of the at least one reference marker is used for a zero point correction of a supplementary method for drift determination.

31. A method according to claim 1, further comprising use of a sample carrier comprising reference markers engraved, embedded or bonded to the sample carrier in performing the method.

32. A light microscope comprising
an objective,
a light source for scanning light,
beam shaping means for forming an intensity distribution of the scanning light in a sample, the intensity distribution comprising a local intensity minimum,
a scanning device for positioning the scanning light in the sample,
a detector for detecting light emission from reference markers in the sample,
a control unit for controlling the scanning device and for processing a detector signal output from the detector,
wherein the control unit is configured to perform a method according to claim 1.

33. The light microscope according to claim 32, wherein the light microscope comprises a sample stage comprising a drive, and wherein the control unit controls the drive so that a drift determined by the position determination of the at least one reference marker is compensated.

* * * * *